United States Patent [19]
Albert et al.

[11] Patent Number: 4,794,940
[45] Date of Patent: Jan. 3, 1989

[54] PLURAL DIAPHRAGM VALVE

[75] Inventors: Robert J. Albert, Salem, N.H.; Paul P. Martyn, Beverly, Mass.

[73] Assignee: COE Corporation, Salem, N.H.

[21] Appl. No.: 727

[22] Filed: Jan. 6, 1987

[51] Int. Cl.$^4$ ............................................. F16K 31/128
[52] U.S. Cl. ............................................. 137/1; 92/49; 137/312; 251/25; 251/46; 251/61.2
[58] Field of Search ............ 92/48, 49; 251/61.1, 251/61.3, 61.4, 61.5, 25, 45, 46, 61.2; 137/1, 312

[56] References Cited

U.S. PATENT DOCUMENTS

| | | | |
|---|---|---|---|
| 1,473,173 | 11/1923 | Brinkerhoff | 92/49 |
| 1,539,630 | 5/1925 | Beaird | 251/61.3 |
| 2,577,967 | 12/1951 | Hughes | 251/25 |
| 2,620,816 | 12/1952 | Griswold | 92/48 |
| 2,659,381 | 11/1953 | Seljos | 92/49 |
| 3,090,400 | 5/1963 | Broome | 137/622 |
| 3,559,945 | 2/1971 | Coiner et al. | 251/61.2 |
| 3,653,408 | 4/1972 | Coiner | 251/61.1 |
| 3,762,430 | 10/1973 | Maercklein | 251/61.3 |
| 3,897,041 | 7/1975 | Cowan | 251/61.1 |
| 4,154,261 | 5/1979 | Budzich | 137/596.13 |
| 4,290,453 | 9/1981 | Bauer | 137/625.43 |
| 4,324,273 | 4/1982 | Bauer et al. | 137/625.43 |
| 4,335,750 | 6/1982 | Bauer et al. | 137/625.29 |
| 4,460,017 | 7/1984 | Robb | 137/625.43 |

FOREIGN PATENT DOCUMENTS 2606199  8/1977  Fed. Rep. of Germany .

Primary Examiner—George L. Walton
Attorney, Agent, or Firm—Wolf, Greenfield & Sacks

[57] ABSTRACT

A diaphragm valve for controlling fluid flow. The valve contains a first and second diaphragm and a piston therebetween. The piston cooperates with the diaphragms controlling their movement within predetermined limits. The piston is preferably limited in travel to limit pressure applied to one diaphragm by means of a mating seat disposed between the diaphragms.

12 Claims, 2 Drawing Sheets

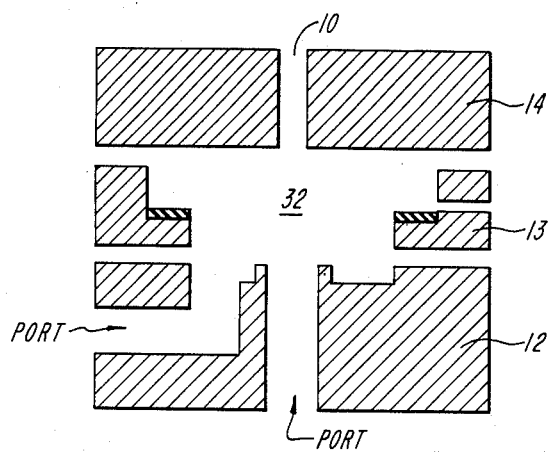
*FIG. 4*
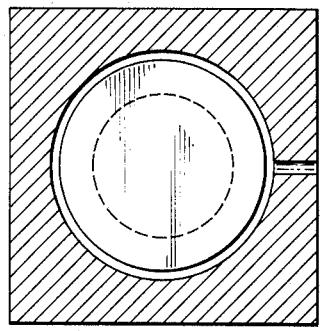  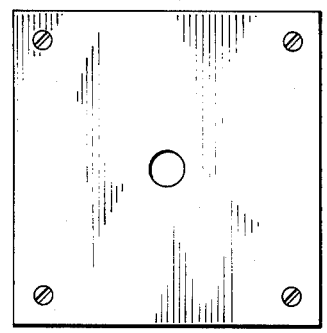
*FIG. 5*          *FIG. 6*

PLURAL DIAPHRAGM VALVE

BACKGROUND OF THE INVENTION

Diaphragm or membrane valves are known in the art. Often a flexible diaphragm is secured between two mating surfaces in a valve body sometimes serving as a gasket or seal there between. The diaphragm forms two discrete chambers by completely separating two more or less symmetrical shallow indentations fabricated in each of the joined faces of the valve body. Often one of the chambers is connected by suitable ports or vents to a source of fluid under control pressure sufficient to cause the diaphragm to invert or reciprocate to come to bear against the surface of the mating indentations which comprising a second chamber. This second chamber is often ported to the exterior of the valve body by an inlet and outlet channel through which the controlled fluid under pressure flows through respective piping or tubing connected to the valve body. The control fluid flows through the valve chamber until pressure applied through the control chamber causes the diaphragm to deflect, cover one or both ports and thereby stop the flow.

Other valves commonly used to control the flow of fluids comprise spool valves and ball valves. In the operation of such valves, the spools or balls slide or rotate through seals which are compressed against them. Factors which can cause such valves to fail are the presence of abrasive solids in the control fluid, which solids cause wear on both the seals and the operating elements. Non-abrasive materials accumulating within a spool valve can obstruct the flow of control fluid through the valve or cause the spool to bind within the seals. For these reasons, spool and ball valves operate most reliably in controlling fluids from which solids and other contaminants have been removed by means such as filters. Provided the control fluid is maintained free of damaging contaminants and the filters, to, are maintained in functioning condition, spool or ball valves are relatively long lived. Even under good operating conditions, however, attrition on the seals is a meaningful factor when spool or ball valves are cycled continuously at short intervals, for example, when used in machines which dose liquid product.

With no mechanical moving parts, and no internal compression seals, diaphragm valves are relatively unaffected by solids or other contaminants in the control fluid passing through them or in the control fluid applied to operate the diaphragm. However, there are certain disadvantages inherent in conventional diaphragm valves commonly used. For example, should the diaphragm rupture, the valve fails. Moreover, the diaphragm must be operated by fluid under pressure often substantially greater than under which the control fluid is passing through the valve.

For example, in the closed position, most of the diaphragm is supported by the floor of the valve chamber. However, those areas of the diaphragm which lie over port(s) being unsupported, must resist the dynamic forces exerted by control pressure each time the valve is cycled. Should the diaphragm become worn or perforated, fluid from the control chamber may become mixed with fluid in the valve chamber. In certain applications, contamination of the fluid passing through the valve chamber can have serious consequences. Furthermore, when diaphragms are used to control volumetric metering devices, leakage through the diaphragm can cause variations in the volumes dosed. Also, in devices of this kind, a random flexure of the unsupported diaphragm causes varying volumes of liquid to be retained in the valve chamber when the valve is closed, thereby affecting the volume of the dose. Inasmuch as the valve will continue to operate, nothwithstanding a minor diaphragm leak, the difficulty of detecting such a leak in a conventional valve could be tantamount to serious malfunction of the device in which the valve is functioning. This is a meaningful consideration in applications where product purity and/or the true volume of discharge are meaningful considerations.

United Kingdom patent application GB No. 2,020,786A filed May 11, 1979 describes a double diaphragm valve which has certain advantages over prior art single diaphragm valves. That patent describes a ring structure which lies between two specially formed diaphragms of resilient material. Such diaphragm valves are an improvement over single diaphragm valves in certain applications.

SUMMARY OF THE INVENTION

It is an object of this invention to provide a double diaphragm valve which will continue to operate notwithstanding perforation of one or both of the diaphragms.

Another object of this invention is to provide a diaphragm valve wherein the diaphragms are mechanically supported substantially over their entire working surfaces.

Still another object of this invention is to provide in a double diaphragm valve means for detecting diaphragm failure upon occurrence, and to provide means of interrupting flow to the valve in event of diaphragm failure.

A further object of this invention is to provide a diaphragm valve which can be operated under pilot pressure equal to, or less than, the pressure of the controlled fluid.

A still further object of this invention is to provide means of controlling precisely the stroke of the diaphragm, whereby deformation of the diaphragm under shear and compressive forces may be minimized.

According to the invention, a plural flexible diaphragm valve for controlling fluid flow has a valve body defining a valve chamber with a chamber bottom. A fluid ingress port and a fluid outlet port is provided with a reciprocally moveable first diaphragm mounted to close one of said ports in a first position of said first diaphragm. A piston having a first side facing the first diaphragm and mounted in a piston chamber is provided. A second reciprocally moveable diaphragm is located on a second side of the piston and acts to define an enclosed portion of the piston chamber. A control fluid chamber is adjacent to the second diaphragm to permit applying a control pressure to the second diaphragm and there through to the piston and the first diaphragm whereby the valve chamber may be closed to fluid flow there through in a first pressure condition and open to fluid flow there through in a second pressure condition thereof. Preferably, the diaphragm valve is provided with a vent to the piston chamber which vent to the atmosphere relieves pressure on the second diaphragm and permits fluid flow through the vent if there is penetration of the first diaphragm.

In a second preferred embodiment, a two diameter piston operates within a two diameter piston bore, with the greater diameter of the piston in contact with the diaphragm subject to control pressure. The diaphragms may be flat or dish shaped, and the piston so configured as to cooperate with the planar contact surfaces of the diaphragms. The stroke of the piston will be arrested by contact between the opposing surfaces of its greater diameter and the shelf formed by the lesser diameter of the bore. Thus, the length of the piston stroke may be precisely controlled, limiting the shear forces exerted upon the diaphragm controlling the valve chamber to no more than is required to seal the port. Hence, deformation is minimal, and the service life of the diaphragm controlling the valve chamber is materially extended. A further effect of the two diameter piston is to amplify the force transmitted from the control fluid to the diaphragm which controls the valve chamber. In practice, therefore, fluid passing through the valve may be controlled with fluid from the same source, delivered at the same pressure.

In another embodiment of the valve, a redundant fail safe feature can be incorporated in the valve by means of interposing between the shoulder of the two diameter piston and the seat or shelf of a counter board spacer plate, a ring of resilient material which is compressed to seal when the valve is in the closed position.

Preferably the valve chamber is provided with a boss around one or each of the ports in the valve chamber. The bosses serve to enhance the seal between the diaphragm and the orifice of the port. Moreover, since the boss provides a raised surface above the floor of the valve chamber, the valve functions notwithstanding a substantial accumulation of solids or other immobile material within the chamber.

The features and embodiments described herein provide a diaphragm valve able to control contaminated gases or liquids carrying solids at substantial rate of flow and under high pressure with minimal stress on the diaphragms. This valve can operate notwithstanding perforation of one or both diaphragms and/or an accumulation of immobile materials on the floor of the valve chamber. The valve may be operated with pilot pressure equal to or less than the pressure of the fluid in the valve chamber. Furthermore, incorporated in this valve are means both to signal the failure of a diaphragm and to actuate a device capable of interrupting flow to the valve in the event of such failure.

The above and other objects, advantages and features of the present invention will be better understood by a review of the following specification in the light of the drawing in which:

DESCRIPTION OF THE DRAWINGS

FIG. 4 is a cross sectional view through line 2—2 of FIG. 1 with the piston and diaphragm elements removed;

FIG. 5 is a cross sectional view through line 5—5 of FIG. 2 showing a top view of a portion of the valve; and FIG. 6 is a bottom view of said valve.

BRIEF DESCRIPTION OF PREFERRED EMBODIMENTS

Figure 1:
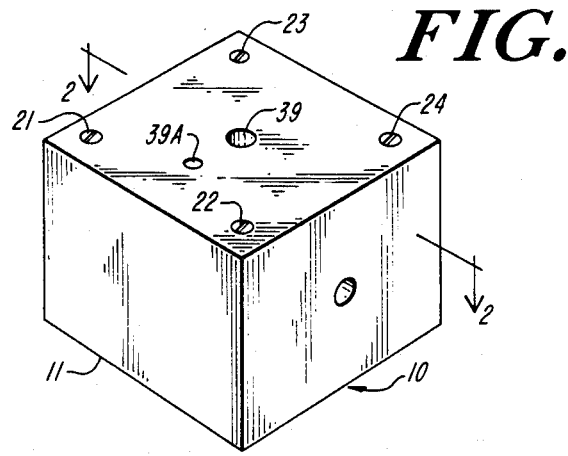
FIG. 1 is a front perspective view of a preferred embodiment of a double diaphragm valve in accordance with this invention.

A plural diaphragm valve for controlling fluid flow is best shown in its preferred embodiment in FIGS. 1-6. The valve 10 comprises a valve housing or body 11 made up of a plurality of components. The body can be made of plastic, metal or other materials as desired.

The valve body 11 comprises a valve base 12, a spacer ring 13 and a cap 14. In the preferred embodiment, the valve body is essentially square although rectangular or other shape bodies can be used. Within the body are mounted a piston 20 and first and second diaphragms 21 and 22 respectively.

Figure 2:
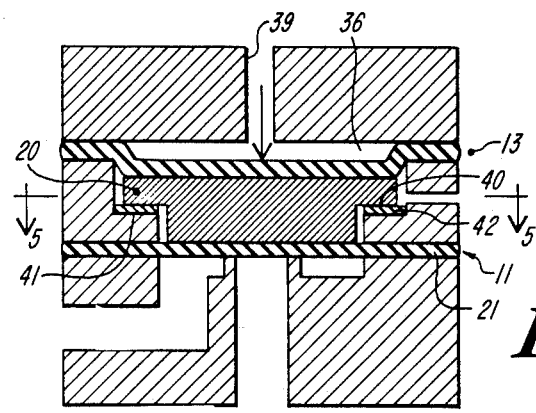
FIG. 2 is a cross section through line 2—2 of FIG. 1 showing a first position of said double diaphragm valve.
Figure 3:
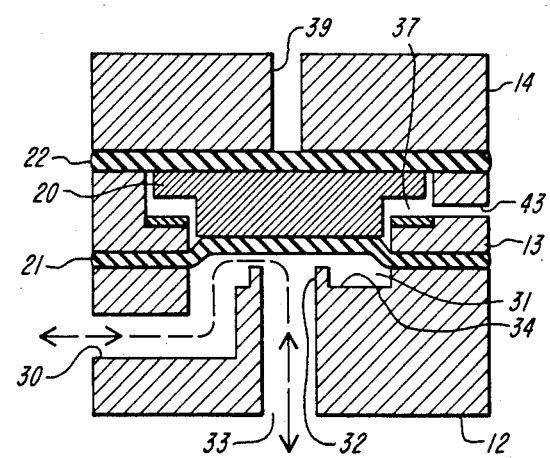
FIG. 3 is a cross sectional view thereof through line 2—2 of FIG. 1 showing a second position of said valve.

The diaphragms 21 and 22 are preferably clamped between the assembled elements of the housing by clamping screws extending through the body from top to bottom as indicated at 21, 22, 23 and 24 in FIGS. 1 and 6. The clamp action causes the diaphragms to form fluid seals against adjacent conponents. The valve base comprises an egress port 30 passing through the valve body side as best shown in FIGS. 2, 3 and 4 to a valve chamber 31 having a boss 32 forming the mouth of the egress passageway 33 ported to an area to which the fluid which can be liquid or gas is to flow. Note that the bottom 34 of the chamber 31 is below the orifice opening of the boss 32. Thus, accumulation of debris and the like will not block the orifice 32 when the diaphragm is in its position as shown in FIG. 2 to stop flow of fluid through the valve.

The chamber 31 is enclosed by the first diaphragm 21. Diaphragms 21, 22 can be of conventional, flexible materials such as teflon, rubber, silicon rubber, or other material preferably impervious to the gas or liquid flowing through the valve and not corrosive or activatable therewith. The diaphragm can be a square sheet in the outer shape of the housing clamped by a spacer ring 13 in the same form. The spacer ring 13 as shown in FIG. 4 has a through bore preferably concentric with the bore of the chamber 31 and defines in part a control fluid chamber 36 and a piston chamber 37. The control fluid chamber 36 is ported to a device (not shown) through which fluid passes under control pressure to the control surface of diaphragm 22. Control fluid may be exhausted through port 39, or through a second control port (not shown).

The piston 20 of the preferred embodiment is a double diameter piston mounted in a double diameter chamber 37 as best seen in FIGS. 2-4. Note that the piston provides a lower surface 40 which is adapted to mate with a seat or stop shoulder means 41, which may be provided with a resilient gasket ring 42 mounted thereon for sealing purposes as will be described. It should be understood that ring 42 can be eliminated and is not required to obtain desirable functions of the valve. The stop shoulder 41 then directly acts to limit travel of the piston and prevent overloading and repeated overstressing of the diaphragm 21 when the valve is closed.

A vent 43 to the atmosphere is provided for the piston chamber between the diaphragms 21 and 22. The chamber is essentially an enclosed chamber, however vent 43 provides a path for fluid should diaphragm 21 or 22 be perforated so that air and/or process fluid can be detected at the vent 43. The compression ring 42 of resilient material acts as a fail safe means when the valve is the closed position of FIG. 2 to prevent flow of product fluid even though the diaphragm 21 or 22 may be damaged.

Preferably the control chamber 36 defines a concave surface in the spacer plate opposite the cap 14 and opposite the valve chamber base 12 to reduce stress on the diaphragms.

The bore and counter bore of the chamber is preferably concentric with the inlet port 33.

In operation of the valve, the control port 39 is used to provide a control pressure to move the piston reciprocally from the position of FIG. 3 to the position of FIG. 2. In this position, the shoulder means 41 acts as a stop to limit pressure on the boss 32 while permitting the diaphragm 21 to seal the boss and prevent egress of fluid. This controls the product flow in that it stops the flow. Upon release of the control pressure as shown in FIG. 3, the piston is automatically moved to its raised position by the pressure of the product flow allowing product flow of fluid or liquid.

In FIG. 3 the valve is in a first (open) position. Control pressure has been relieved in port 39 of the valve cap 14. Controlled fluid under pressure flows into chamber 31 via ingress port at 33. The pressure of the controlled fluid deflects diaphragm 21 upward, raising piston 20 and diaphragm 22. With the valve thus opened, controlled fluid passes from the port at 33 to egress port 30.

FIG. 2 illustrates the valve in a second (closed) position. Valve cap control port 39 has operated to bring control pressure to bear on diaphragm 22. The force exerted on diaphragm 22 deflects it, displacing piston 20 downward until it meets the shelf in spacer plate 13 and is thereby arrested. The stroke of piston 20 has deflected diaphragm 21 and has compressed its opposite surface against the ring formed by boss 32. In this position, the unit force compressing diaphragm 21 against boss 32, is very large. However, by supporting the diaphragm over substantially all of its working surface, and by limiting the stroke of the piston in accordance with the present invention, this force may be applied to seat and seal the diaphragm without subjecting it to shear forces and deformation beyond what is necessary to effect the seal.

In a preferred embodiment of this invention, as shown in FIG. 2, the overall thickness of the piston head is 0.25 inches, that of the greater diameter of the piston 0.094 inches, and that of the lesser diameter 0.16 inches. Clearance between the piston and the walls of the piston chamber is approximately 0.01 inches. The diaphragms, comprised of fabric reinforced elastomers are 0.06 inches thick. The volume of the control chamber in the open position in 0.08 cubic inches. The boss, concentric with the floor of the valve chamber has a diameter of 0.375 inches and provides a valve seat 0.06 inches above the floor of the valve chamber. The vent of the piston chamber is 0.125 inches in diameter, and control port 39 is 0.025 inches in diameter.

A valve constructed in accordance with the dimensions set forth above can operate under control pressures from 10 psig to 500 psig and at frequencies of as much as 400 cycles per minute.

It will be understood that control of the diameter of the upper portion of the piston as compared to the diameter of the lower portion adjacent diaphragm 21 permits varying fluid pressures to control the valve. By enlarging the surface area at the top of the piston, less pressure is needed in the control fluid making possible use of the product flow as a control fluid in many cases.

Preferably the piston has a substantially flat upper and lower surface to support the diaphragm and prevent undue distortion of the diaphragm during opening and closing which can prolong the life of the diaphragm and enable the use of greater pressures; however, dome, dish, or other shapes can be used.

While a single valve has been described, it should be understood that a plurality of valves in accordance of the present invention can be joined together in various valving and control arrangements.

While specific embodiments of the invention have been shown and described, many variations are possible within the scope of the invention.

What is claimed is:

1. A plural diaphragm valve for controlling fluid flow, said valve comprising a valve housing defining a valve chamber having a chamber bottom, a fluid ingress port, a fluid egress port and a reciprocally moveable first diaphragm mounted to directly close seat on and seal one of said ports in a first positions of said first diaphragm, a piston having a first side facing said first diaphragm and mounted in a piston chamber defined by said housing, a second reciprocally moveable diaphragm on a second side of said piston and acting to define an enclosed portion of said piston chamber, said piston chamber defining a vent to the atmosphere disposed between said first and second diaphragms and permitting fluid flow through said vent if there is penetration of said first or second diaphragm, a control fluid chamber adjacent said second diaphragm to permit applying a control pressure to said second diaphragm and there through to said piston and first diaphragm whereby said valve chamber may be closed to fluid flow there through in a first pressure condition and open to flow of fluid flow there through in a second pressure condition thereof, said piston defining an enlarged diameter section whereby control pressure necessary in said control fluid chamber to move said diaphragm to said first pressure condition or said second pressure condition, can be different from or equal to a pressure condition of product flow through said valve from said ingress port to said egress port, said enlarged diameter portion of said piston being disposed between said first and second diaphragms and arranged to mate with a seat also disposed between said first and second diaphragms for preventing unwanted pressure being applied to said first diaphragm when said first diaphragm seats on said one port.

2. A diaphragm valve in accordance with claim 1 and further comprising said piston defining an enlarged diameter section whereby control pressure necessary in said control fluid chamber to move said diaphragm to said first pressure condition or said second pressure condition, can be different from or equal to a pressure condition of product flow through said valve from said ingress port to said egress port.

3. A diaphragm valve in accordance with claim 2 wherein said enlarged diameter of said piston is substantially adjacent said second diaphragm.

4. A diaphragm valve in accordance with claim 3 and further comprising said seat having shoulder means providing a resilient facing for seating said second diameter portion of said piston to seal said piston chamber when said piston is in said closed position of said valve.

5. A diaphragm valve in accordance with claim 1 and further comprising one of said ingress or egress ports comprising a raised lip orifice portion substantially located with an open mouth in a plane parallel to a plane of said first diaphragm and above a lower portion of said chamber bottom.

6. A plural diaphragm valve for controlling fluid flow,
   said valve comprising a valve housing defining a valve chamber having a chamber bottom, a fluid ingress port, a fluid egress port and a reciprocally moveable first diaphragm mounted to directly close one of said ports in a first position of said first diaphragm,
   a piston having a first side facing said first diaphragm and mounted in a piston chamber defined by said housing,
   a second reciprocally moveable diaphragm on a second side of said piston and acting to define an enclosed portion of said piston chamber,
   said piston having an enlarged diameter portion,
   said enlarged diameter portion of said piston being disposed between said first and second diaphragms and arranged to mate with a seat also disposed between said first and second diaphragms for preventing unwanted pressure being applied to said first diaphragm when said first diaphragm seats on said one port,
   and a control fluid chamber adjacent said second diaphragm to permit applying a control pressure to said second diaphragm and there through to said piston and first diaphragm whereby said valve chamber may be closed to fluid flow there through in a first pressure condition and open to flow of fluid flow there through in a second pressure condition thereof.

7. A diaphragm valve in accordance with claim 6 and further comprising said valve body comprising a valve base, a spacer ring and a cap,
   said spacer ring acting to mount said first and second diaphragms clamping each respectively between said cap and said valve base when said valve body is assembled.

8. A diaphragm valve in accordance with claim 6 and further comprising said piston chamber defining a vent to the atmosphere relieving pressure on said second diaphragm and permitting fluid flow there through if there is a penetration of said first diaphragm.

9. A diaphragm valve in accordance with claim 7 and further comprising one of said ingress or outlet ports comprising a raised lip orifice portion substantially located with an open mouth in a plane parallel to a plane of said first diaphragm and above a lower portion of said chamber bottom.

10. A diaphragm valve in accordance with claim 9 and further comprising said piston chamber defining a vent to the atmosphere relieving pressure on said second diaphragm and permitting fluid flow there through if there is a penetration of said first diaphragm.

11. In a method of controlling fluid flow the steps comprising providing a valve having a double diameter piston having a diaphragm on either side thereof with a valve chamber defined below one of said diaphragms,
    providing a stop between said diaphragms for one diameter of said piston with said stop located in a path of travel of said piston from an opened to a closed position of said valve chamber, reciprocating said piston by means of a control fluid to open and close said valve chamber, with said piston providing a solid support whereby said diaphragms are flexed about the edge of said piston with an area of each diaphragm adjacent said piston being supported by said piston, and said stop acting to limit force on one of said diaphragms when said valve is in a fully closed position to prevent unwanted pressure being applied to said one diaphragm when said one diaphragm seats on a port to close said valve.

12. The method of claim 11 and further providing a vent means between said diaphragms for detecting a fluid penetration of one of said diaphragms.

* * * * *